(12) United States Patent
Ivonnet et al.

(10) Patent No.: US 7,869,409 B2
(45) Date of Patent: Jan. 11, 2011

(54) SYSTEM AND METHOD FOR TRANSMITTING A MULTIPLE FORMAT WIRELESS SIGNAL

(75) Inventors: Jorge Ivonnet, Lake Worth, FL (US); Robert Mark Gorday, Wellington, FL (US); Kevin McLaughlin, Lake Worth, FL (US)

(73) Assignee: Freescale Semiconductor, Inc., Austin, TX (US)

( * ) Notice: Subject to any disclaimer, the term of this patent is extended or adjusted under 35 U.S.C. 154(b) by 608 days.

(21) Appl. No.: 11/691,349

(22) Filed: Mar. 26, 2007

(65) Prior Publication Data

US 2008/0240167 A1    Oct. 2, 2008

(51) Int. Cl.
*H04W 4/00* (2009.01)
*H04B 1/00* (2006.01)
*H03M 13/00* (2006.01)

(52) U.S. Cl. .............. 370/335; 375/139; 375/145; 375/147; 375/150; 714/757

(58) Field of Classification Search ............. 375/145, 375/150, 139, 147; 714/757
See application file for complete search history.

(56) References Cited

U.S. PATENT DOCUMENTS 5,940,435 A * 8/1999 Hendrickson .............. 375/147

2003/0046629 A1 * 3/2003 Roh et al. .................. 714/757
2005/0243894 A1 * 11/2005 Chen et al. ................. 375/139

OTHER PUBLICATIONS

Spread Spectrum, introduction by ir. J. Meel, 1999.*
cdma2000 System for Mobile Communications, Vanghi, Damnjanovic, and Vojcic, (c) 2004.*
"The CDMA2000 System for Mobile Communications" by Vieri Vanghi, Aleksandar Damnjanovic, and Branamir Vojcic, (c) 2004 ("Vojcic") p. 20. Reprinted from an e-book version, as pp. 1-11.*

* cited by examiner

*Primary Examiner*—Marivelisse Santiago-Cordero
*Assistant Examiner*—Joshua Schwartz

(57) ABSTRACT

A multi-mode transmitter (301) is adapted to modulate a data packet (200) communicated by a wireless communications signal. The data packet includes a packet header comprising a preamble (201) and a start of frame delimiter (202), and a data payload comprising a payload data length portion (203) and a payload portion (204). The packet header is modulated with a spread spectrum technique. When transmitting a data payload in one mode, the data payload is also modulated with the spread spectrum technique. When transmitting a data payload in another mode, the data payload is modulated with a non-spread spectrum technique.

20 Claims, 2 Drawing Sheets

SYSTEM AND METHOD FOR TRANSMITTING A MULTIPLE FORMAT WIRELESS SIGNAL

BACKGROUND

1. Field

This disclosure relates generally to transmission of digitally modulated wireless signals, and more specifically to transmission of wireless signals modulated with both spread spectrum and non-spread spectrum modulation.

2. Related Art

Direct sequence spread spectrum communications systems operate by encoding each data bit over a number of modulated channel symbols that are referred to as chips. Each channel symbol also encodes a pseudorandom data sequence. Although a direct sequence spread spectrum communications system includes modulation and receiving equipment that process the signal at the modulated chip rate, data throughput is reduced by the spread spectrum coding. Direct sequence spread spectrum receivers correlate a received signal with a reproduction of the pseudorandom data sequence to extract the encoded data. The operation of direct sequence, spread spectrum systems allows the communication of data with enhanced interference rejection.

One direct sequence spread spectrum communications application is the IEEE 802.15.4 communications standard. The incorporation of direct sequence spread spectrum signals in the IEEE 802.15.4 communications standard allows reliable communications over an extended range. This use of direct sequence spread spectrum signals, however, reduces the data throughput of IEEE 802.15.4 systems relative to the total bandwidth consumed by the system and the corresponding capacity of the processing hardware of the communications equipment.

Therefore, a technique that would allow the hardware used to implement an IEEE 802.15.4 transmitter to communicate at a higher data rate throughput than is supported by that standard expands the usability of that hardware.

The IEEE 802.15.4 protocol specifies that the 2.4 GHz physical layer be implemented with offset quadrature phase shift keying (O-QPSK) modulated with half-sine pulse shaping. This modulation format is also known as minimum shift keying (MSK). Even-indexed chips are modulated onto an in-phase (I) carrier and odd-indexed chips are modulated onto a quadrature-phase (Q) carrier. Because each data symbol is represented by a 32-chip sequence, the chip rate is 32-times the symbol rate. The IEEE 802.15.4 protocol specifies a bit rate of 250 kbps and a chip rate of 2000 kcps, which means that protocol has a spreading gain of eight (8).

FIG. 1 illustrates a prior art packet 100 used in the protocol of the IEEE 802.15.4 standard. The prior art packet 100 comprises a preamble 101, a start of frame delimiter (SFD) 102, a payload data length (PHR) portion 103 and a payload portion 104. The protocol of the IEEE 802.15.4 standard specifies that the data of the entire prior art packet 100 is transmitted using spread spectrum modulation. The preamble 101 of the prior art packet 100 comprises eight (8) symbols. The payload portion 104 comprises up to 256 symbols. Each symbol comprises four (4) bits. Each bit comprises eight (8) chips.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Figure 1:
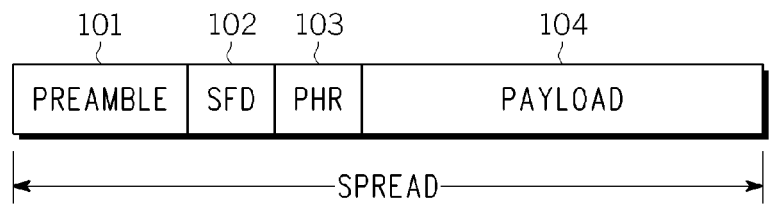
FIG. 1 illustrates a prior art data packet format used for data communications.
Figure 2:
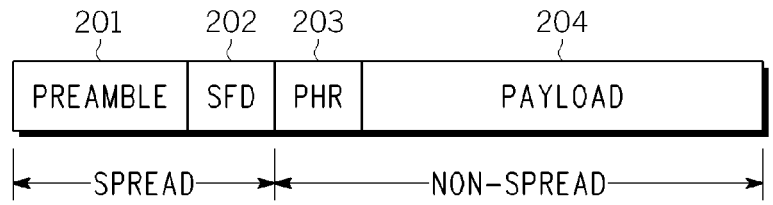
FIG. 2 illustrates a data packet format used for data communications in accordance with the exemplary embodiment of the present invention.

FIG. 2 illustrates a structure for a wireless data packet, or data packet, or packet, 200 used by an exemplary embodiment of the present invention for transmitting a non-spread spectrum signal in the packet structure of the protocol of the IEEE 802.15.4 standard. The packet 200 comprises a preamble 201, a start of frame delimiter (SFD) 202, a payload data length (PHR) portion 203 and a payload portion 204. The preamble 201 and the SFD 202 are transmitted using spread spectrum modulation. A packet header consists of the preamble 201 and the SFD 202. The payload data length portion 203 and the payload portion 204 are transmitted using non-spread spectrum modulation. A data payload for the packet 200 consists of the payload data length portion 203 and the payload portion 204. Alternatively, the data payload consists of only the payload portion 204.

The packet 200 is used by the exemplary embodiment of the present invention to communicate data using one of two modulation and encoding formats. Regardless of which of the two modulation and encoding formats is selected, the packet 200 uses direct sequence spread spectrum modulation (DSSS), as defined by the IEEE 802.15.4 standard, for the preamble 201 and the SFD 202. Depending upon which of the two modulation and encoding formats is selected, the payload data length portion 203 and the payload portion 204 are modulated and encoded according to one of the two modulation and encoding formats. The payload data length portion 203 and the payload portion 204 of the packet 200 are able to be modulated and encoded by using either spread spectrum modulation as defined by the IEEE 802.15.4 standard or alternatively by using a non-spread spectrum modulation. User data bits are encoded into the channel symbols within the payload portion 204. The use of non-spread spectrum modulation for transmission of data in the payload data length portion 203 and the payload portion 204 allows greater data rate throughput for close range communications.

The location and size of the preamble 201 and the SFD 202 are defined pursuant to packet header formats defined by the IEEE 802.15.4 standard. The preamble field 201 contains a defined data pattern that allows a receiver to acquire and synchronize to the channel symbol transitions of the packet 200. The SFD 202 contains a value that defines the modulation and encoding format used for the payload data length portion 203 and the payload portion 204, as is described below.

The payload data length portion 203 of the packet 200 defines the number of bits contained in the payload portion 204 of the packet 200. The exemplary embodiment of the present invention uses a first number of bits for the payload data length portion 203 when the payload data length portion 203 and the payload portion 204 are modulated with spread spectrum modulation, and uses a second number of bits when the payload data length portion 203 and the payload portion 204 are modulated with non-spread spectrum modulation. The exemplary embodiment encodes the payload data length portion 203 that is modulated with a non-spread spectrum format with a larger number of bits than the payload data length portion 203 conforming to the format defined pursuant to the IEEE 802.15.4 standard. A larger number of bits is used for the payload data length portion 203 when non-spread spectrum modulation is used to accommodate the larger number of user data bits that are able to be transferred by the payload portion 204 when using non-spread spectrum modulation. When spread spectrum modulation is used, the payload data length portion 203 defined by the IEEE 802.15.4 standard is used.

The SFD 202 of the exemplary embodiment of the present invention is able to contain one of two pre-defined values, a SFD value defined pursuant to the IEEE 802.15.4 standard and a SFD value not defined by the IEEE 802.15.4 standard. These two SFD values each identify a particular modulation and encoding format for the payload portion 204. A first pre-defined value for the SFD 202 is 'A7' in hexadecimal corresponds to the value of the SFD defined by the IEEE 802.15.4 standard. A second pre-defined value for the SFD 202 is a pre-defined value that is not defined as a valid SFD by the IEEE 802.15.4 standard and indicates that the payload data length portion 203 and the payload portion 204 are modulated by a non-spread spectrum modulation technique. One embodiment of the present invention modulates data bits in the payload data length portion 203 and the payload portion 204 using the same modulation technique as the modulation technique defined for modulation of spreading chip symbols of the IEEE 802.15.4 standard. When modulating with a non-spread spectrum modulation, however, each user data bit is encoded into one channel bit.

Packets 200 that are modulated and encoded with either of the above described formats have a preamble 201 and a start of frame delimited 202 that conform to the modulation and encoding format defined by the IEEE 802.15.4 standard.

Figure 3:
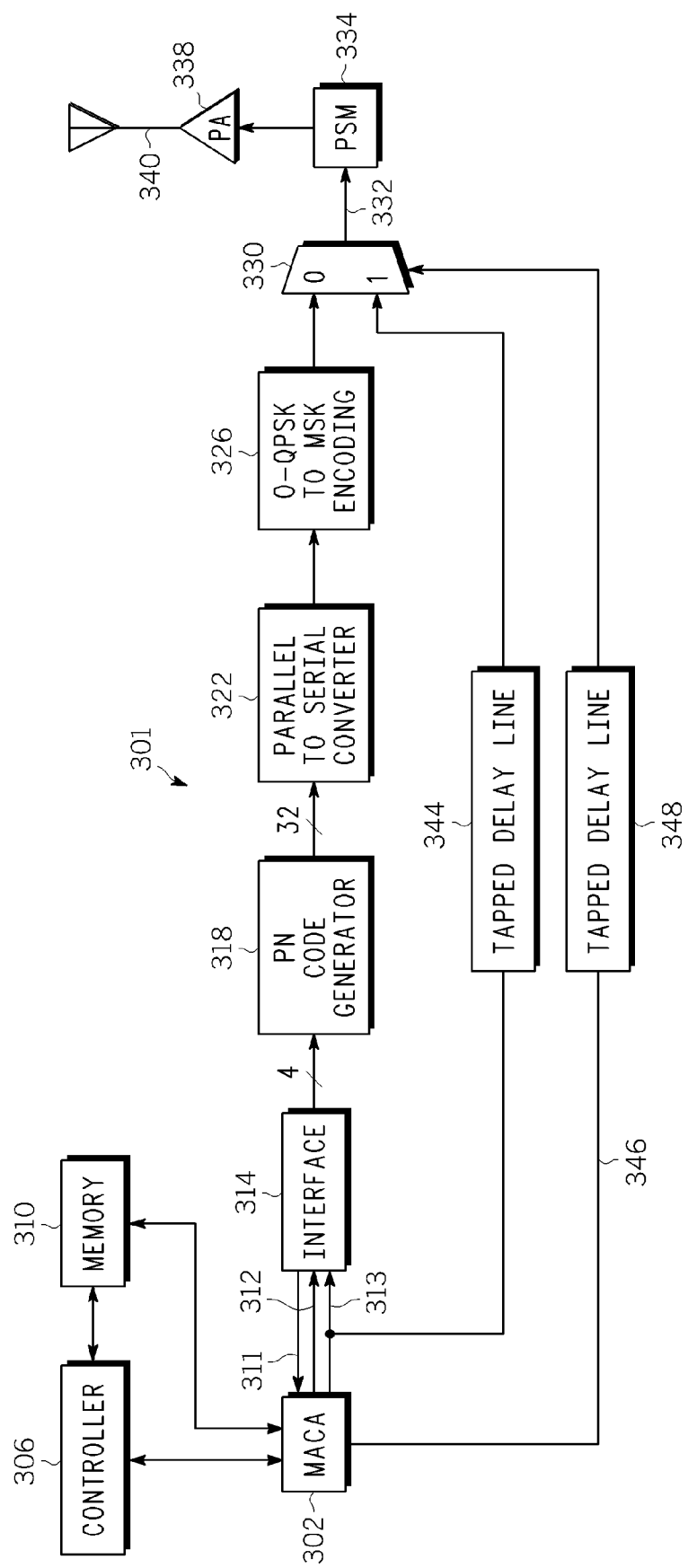
FIG. 3 illustrates a block diagram of a portion of a transceiver including a portion of a multi-mode transmitter in accordance with the exemplary embodiment of the present invention.

FIG. 3 is a simplified functional block diagram of a portion of a transceiver 300, including a portion of a multi-mode transmitter 301 that is able to transmit signals modulated with either of the modulation and encoding formats described above. The portion of the transmitter 301 shown includes a portion commonly referred to as a transmit modem. The transmitter 301 comprises a Media Access Controller hardware Accelerator (hereinafter "media access controller" or "MACA") 302 coupled to a controller 306, to a memory 310 and to an interface 314. The MACA 302 generates the contents and structure of the packet 200. The MACA identifies the packet 200 as one of a standard mode and a non-standard mode. Accordingly, the MACA generates a serial data stream of bits that comprises the preamble 201, the SFD 202, the payload data length portion 203 and the payload portion 204. In the exemplary embodiment, the controller 306 is a microprocessor, and the memory 310 is a semiconductor memory structure. The MACA 302 is coupled to the interface 314 via a bit clock line 311, a bit start line 312 and a bit out line 313. A bit clock signal on the bit clock line 311 synchronizes the data between the MACA 302 and the other portions of the transmitter. A bit start signal on the bit start line 312 indicates the start of the packet 200 to be transmitted. The bit out line 313 conveys contents of the packet 200 to the interface 314. The interface 314 is coupled to a pseudorandom (PN) code generator 318 via a 4-bit coupling. The interface 314 sequentially outputs a 4-bit data symbol in binary. The PN code generator 318 performs spreading, i.e., symbol-to-chip mapping. The PN code generator 318 is coupled to a parallel-to-serial converter 322 via a 32-bit coupling. The PN code generator 318 sequentially outputs a 32-chip PN sequence for each 4-bit data symbol, pursuant to the IEEE 802.15.4 standard. The parallel-to-serial converter 322 sequentially outputs a 32-chip PN sequence serially for each 32-chip PN sequence that it receives in parallel. A data stream from the output of the parallel-to-serial converter 322 is in the form of offset quadrature phase shift keying (O-QPSK). The mode of transmission of the IEEE 802.15.4 standard is performed by recognizing that O-QPSK modulation with half-sine pulse shaping is equivalent to MSK modulation with $\Delta f_c = 1/(4T_b)$, where $f_c$ is the central frequency and $T_b$ is the bit (or chip) interval. The parallel-to-serial converter 322 is coupled to an O-QPSK to MSK encoding circuit 326. The O-QPSK data stream from the output of the parallel-to-serial converter 322 needs to be encoded into an equivalent minimum shift keying (MSK) representation. This encoding comprises binary differential decoding followed by alternate bit inversion. The resultant signal is a clockwise/counter-clockwise rotation indicator, which is called a psm_cw signal 332. The O-QPSK to MSK encoding circuit 326 is coupled to one of two inputs of a multiplexer 330. In an alternative embodiment, O-QPSK to MSK coding is performed within the PN code generator 318, in which case the O-QPSK to MSK encoding circuit 326 is not needed. In such alternative embodiment, the PN codes are pre-coded using O-QPSK to MSK, as opposed to using the PN codes defined by the IEEE 802.15.4 standard.

The transmitter 301 includes a first tapped delay line 344. The input of the first tapped delay line 344 is coupled to the bit out line 313, and the first tapped delay line receives the contents of a non-spread spectrum portion of the packet 200 from the MACA 302. The output of the first tapped delay line 344 is coupled to a second of the two inputs of the multiplexer 330. The transmitter 301 includes a second tapped delay line 348. The input of the second tapped delay line 348 is coupled to, and receives a signal from, the MACA 302. An output of the second tapped delay line 348 is coupled to a select input of the multiplexer 330. The MACA 302 outputs the frame length start signal 346 to the second tapped delay line 348. The frame length start signal 346 momentarily goes high simultaneous with the occurrence of the beginning edge of a first bit of the payload data length portion 203. In other words, the frame length start signal 346 goes high upon the occurrence of the start of the non-spread spectrum portion of the packet 200. The two tapped delay lines 344 and 348 are used to compensate for the delay through the transmitter 301 experienced by the preamble 201 and the SFD 202 (a spread spectrum portion) of the packet 200. The amount of delay to the frame length start signal 346 caused by the first tapped delay line 344 is selected to approximately equal the delay through the transmitter 301 experienced by the preamble 201 and the SFD 202. The amount of delay caused by the first tapped delay line 344 is selected so that the serial data stream of bits that comprises a non-spread spectrum data payload arrives at the multiplexer 330 at approximately the same time as when a spread spectrum data payload arrives.

When the transmitter 301 is transmitting a non-spread payload, the signal at the output of the multiplexer 330 comprises first, the spread spectrum MSK chips of the preamble 201 and the SFD 202, and then, the MSK bits of the payload data length portion 203 and the payload portion 204. When the transmitter 301 is transmitting a spread spectrum payload, the signal at the output of the multiplexer 330 comprises the spread spectrum MSK chips of the preamble 201, of the SFD 202, of the payload data length portion 203 and of the payload portion 204. The output from the multiplexer 330 is coupled to a phase shift modulator (PSM) 334. The PSM 334 modulates the psm_cw signal 332 onto a carrier using MSK modulation. An analog signal outputted from the PSM 334 to other portions of the transmitter 301 that are not shown in FIG. 3 because they are well known to persons skilled in the art. For example, a local oscillator and in-phase and quadrature phase mixers, although not shown in FIG. 3, may be present in the transmitter 301. The transmitter 301 includes a power amplifier 338 and an antenna 340. In the exemplary embodiment, the transmitter transmits a signal in the 2.4 GHz band.

The timing between the last chip of the SFD 202 and the first bit of the payload data length portion 203 is advantageously aligned such that the data to the PSM 334 is switched from the encoding circuit 326 to the raw data stream outputted by the MACA 302 on the bit out line 313 without any loss of information. The group delay through the encoding circuit 326 and other miscellaneous logic in the transmitter 301 is pre-determined, and is taken into account when the switch to the raw data stream by the MACA is made.

The transmitter 301 transmits a non-standard IEEE 802.15.4 packet where the preamble 201 and the SFD 202 (i.e., the sync portion of the packet 200) are spread using DSSS, and the payload data length portion 203 and the payload portion 204 (i.e., the payload portion of the packet) are non-spread/un-coded and modulated onto the carrier at the chip rate. This results in an increased data rate of 2 Mbps as opposed to 250 kbps, as specified in the 802.15.4 standard.

In order to increase the data rate, the circuit advantageously includes the option to remove the spreading/coding for data following the SFD 202. The data is then modulated onto the carrier at the chip rate only during the payload data length portion 203 and the payload portion 204. For the non-spread portion of the packet, the data does not need to be encoded. When transmitting the non-spread portion of the packet 200, the O-QPSK to MSK encoding is bypassed because the non-standard receiver (not shown) is an MSK demodulator. When transmitting the non-spread portion of the packet 200, the data is then sent directly to the PSM 334 to modulate the carrier.

The transmitter 301 has knowledge of the last chip of the SFD 202 when transmitting a non-standard packet 200. The MACA 302 instructs the transmitter 301 whether the packet 200 to be transmitted is a standard 802.15.4 packet or is a non-standard packet with un-coded payload. In order to synchronize the transition from the SFD 202 (spread data) to the payload data length portion 203 (non-spread data), the MACA 302 indicates to the transmitter the first bit of the payload data length portion 203. The first bit of the payload data length portion 203 is then used by the transmitter 301 to switch from spread to non-spread data.

Because a receiver (not shown) that receives the non-spread payload has an MSK demodulator, it is desirable to bypass the O-QPSK to MSK encoding circuit 326 and send the non-spread packet data directly to the PSM 334 as the psm_cw signal 332. To simplify this transition, and to compensate for the group delay from spread to non-spread data, the transmitter uses the two tapped delay lines 344 and 348. The two tapped delay lines 344 and 348 are used to compensate for the internal delay through the transmitter 301 during the preamble 201 and SFD 202 portions of the packet 200. The tapped delay lines 344 and 348 are used to overcome the handoff/synchronization problem. The transition from spread to non-spread data is handled seamlessly by using tapped delay lines 344 and 348 to switch from O-QPSK to MSK data to control the PSM 334.

Figure 4:
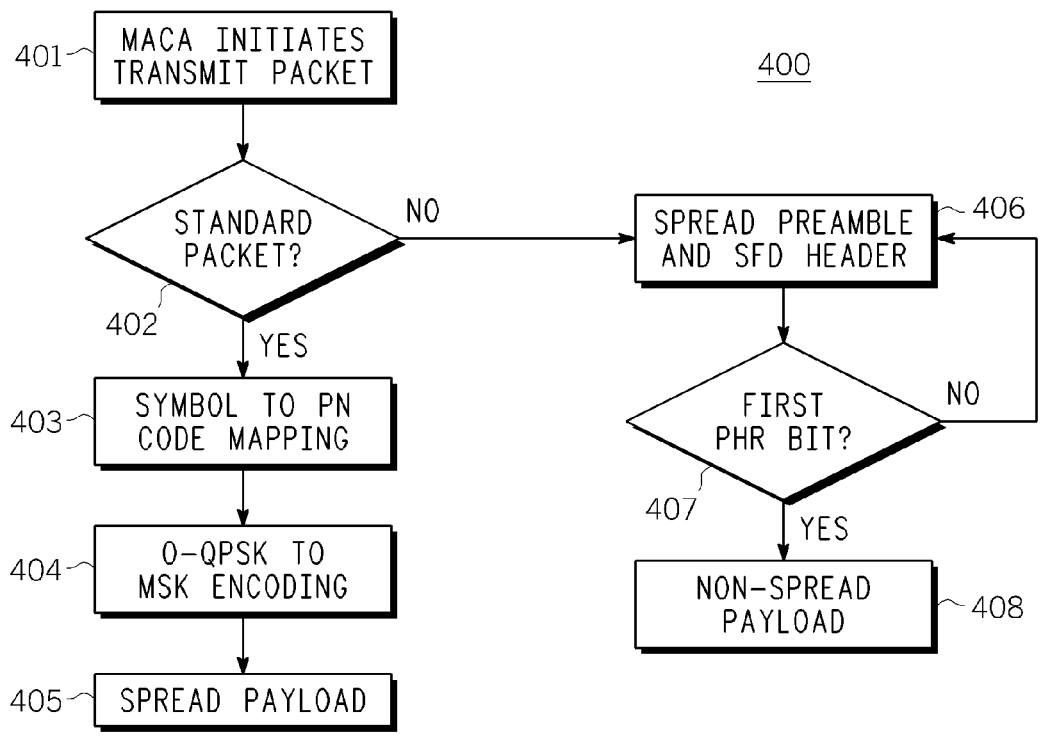
FIG. 4 illustrates a processing flow diagram for transmission of a data packet as performed by the multi-mode transmitter shown in FIG. 3.

FIG. 4 illustrates a processing flow diagram for transmission of a packet as performed by the multi-mode transmitter 301 shown in FIG. 3. The method starts when the MACA 302 initiates a transmit packet at step 401. At step 402, the MACA determines which type of packet is going to be transmitted. If the packet is a standard packet 100, the flow continues to step 403. At step 403, the PN code generator 318 performs symbol to PN code mapping. At step 404, the transmitter 301 performs O-QPSK to MSK encoding. At step 405, a spread payload is produced. Returning now to step 402. If the packet is a non-standard (i.e., non-spread) packet 200, the flow continues to step 406. At step 407, the transmitter waits for the first bit of the payload data length portion 203 to arrive at the multiplexer 330. When the first bit arrives, a non-spread payload is produced.

The placement of the O-QPSK to MSK encoding operation in the transceiver system (not shown) impacts the BER and burst error performance. Different applications (e.g., voice) use bit error rate (BER) as a quality indicator. For example, voice applications require low bit error rates for acceptable operation. Burst errors in a receiver (not shown), when performing O-QPSK to MSK decoding, are minimized by placing the O-QPSK to MSK encoding operation in the transmitter 301.

The coding logic, i.e., the O-QPSK to MSK encoding hardware, is placed on the transmitter side of the transceiver system, rather than on the receiver side, to minimize burst errors in the BER on the receiver side. If the coding logic were not on the transmitter side, the differential encoding and alternate bit inversion would be required in the receiver to reverse the encoding, which includes binary differential decoding, done at the transmitter 301. In the receiver, the decoding, which includes binary differential encoding, creates a burst of errors that lasts until the next error. As a result, one bit error early in the packet 200 may cause the receiver to miss all the succeeding bits of the packet (high BER), thereby failing to properly receiver the entire packet, but, nevertheless, failing to receive only one packet (low packet error rate). Therefore, the packet error rate may be acceptable but the BER may be unacceptable.

It should be understood that all circuitry described herein may be implemented either in silicon or another semiconductor material or alternatively by software code representation of silicon or another semiconductor material.

Although the invention is described herein with reference to specific embodiments, various modifications and changes can be made without departing from the scope of the present invention as set forth in the claims below.

Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims. Unless stated otherwise, terms such as "first" and "second" are used to arbitrarily distinguish between the elements such terms describe. Thus, these terms are not necessarily intended to indicate temporal or other prioritization of such elements.

What is claimed is:

1. A communications signal transmitter for wirelessly transmitting more than one type of data packet, comprising:
 a media access controller for generating a structure of a data packet, for generating a serial data stream of bits representing contents of the data packet, and for generating a frame length start signal that indicates length of a frame of the data packet, wherein the media access controller simultaneously outputs the serial data stream of bits to a first portion of the transmitter and to a second portion of the transmitter, wherein the first portion of the transmitter includes:
- a pseudorandom (PN) code generator, coupled to the media access controller, for spreading symbols of the serial data stream of bits into PN chips, and
- an encoding circuit, having an input coupled to the PN code generator, for encoding offset quadrature phase shift keying (O-QPSK) to minimum shift keying (MSK), and for outputting spread spectrum chips that represent the contents of the data packet, wherein the outputting of said spread spectrum chips occurs subsequent to inputting of the serial data stream of bits into the first portion of the transmitter by an amount of time equal to a total group delay without use of a tapped delay line in the first portion of the transmitter, and wherein the second portion of the transmitter includes:
- a first tapped delay line, coupled to the media access controller, for delaying the serial data stream of bits by an amount equal to the total group delay, and for outputting non-spread spectrum bits that represent the contents of the data packet;

a second tapped delay line, coupled to the media access controller, for delaying the frame length start signal by the amount equal to the total group delay; and a multiplexer, coupled to the second tapped delay line, for receiving at one input the spread spectrum chips from the encoding circuit, and at another input the non-spread spectrum bits from the first tapped delay line, an output from the multiplexer being selected by a delayed frame length start signal, a value of the delayed frame length start signal being dependent upon the type of data packet.

2. The communications signal transmitter of claim 1, in which the encoding circuit encodes offset quadrature phase shift keying (O-QPSK) to minimum shift keying (MSK) by binary differential decoding followed by alternate bit inversion.

3. The communications signal transmitter of claim 1, in which the data packet comprises a packet header and a data payload, and in which the media access controller generates a value to a field within the packet header to indicate the type of data packet.

4. The communications signal transmitter of claim 3, in which the packet header comprises a preamble and a start of frame delimiter (SFD), and in which the media access controller generates a value to a field within the SFD to indicate the type of data packet.

5. The communications signal transmitter of claim 3, in which the media access controller generates a value for the frame length start signal, such that the frame length start signal momentarily changes its value with occurrence, at an input of the multiplexer, of a beginning edge of a first bit of the data payload.

6. The communications signal transmitter of claim 3, in which the data payload comprises a payload data length portion and a payload portion.

7. The communications signal transmitter of claim 6, in which the media access controller generates a value for the frame length start signal, such that the frame length start signal momentarily changes its value with occurrence, at an input of the multiplexer, of a beginning edge of a first bit of the payload data length portion.

8. The communications signal transmitter of claim 3, in which the multiplexer receives at one input spread spectrum MSK chips from the encoding circuit that represent the contents of the data payload of the data packet, and at another input receives non-spread spectrum bits from the first tapped delay line which bits represent the contents of the data payload of the data packet, depending upon the type of data packet.

9. The communications signal transmitter of claim 1, in which the media access controller generates the value of the frame length start signal to indicate the type of data packet.

10. A method for transmitting a wireless data packet, the wireless data packet comprising a packet header and a data payload, the method comprising the steps of:
- generating a structure and contents of a wireless data packet to be transmitted;
- generating contents of the data payload of the wireless data packet as bits of a serial bit stream;
- determining a type of the wireless data packet to be transmitted;
- performing symbol to pseudorandom (PN) code mapping on the contents of the packet header of the wireless data packet to be transmitted, wherein the symbol to PN code mapping is accomplished over a first interval of time;
- performing O-QPSK to MSK encoding on the contents of the packet header of the wireless data packet to be transmitted by binary differential decoding followed by alternate bit inversion, thereby producing spread spectrum MSK chips that represent the contents of the packet header, wherein the O-QPSK to MSK encoding is accomplished over a second interval of time; and
- in response to the type of wireless data packet to be transmitted, performing one of sub-steps a) and sub-steps b):
  a) performing symbol to PN code mapping on the contents of the data payload,
     performing O-QPSK to MSK encoding on the contents of the data payload by binary differential decoding followed by alternate bit inversion, and
     modulating the wireless data packet using minimum shift keying;
  b) delaying the serial bit stream of the contents of the data payload by an amount of delay equal to the sum of the first interval of time and the second interval of time such that timing between a last spread spectrum MSK chip of the packet header and a first bit of the data payload is aligned, and
     modulating the wireless data packet using minimum shift keying such that the spread spectrum MSK chips that represent the contents of the packet header and non-spread spectrum bits that represent the contents of the data payload, are modulated without any loss of information.

11. The method of claim 10, in which the step of generating a structure and contents of a wireless data packet to be transmitted includes
- generating a packet header, the packet header including a preamble and a start of frame delimiter (SFD), and
- generating a data payload, the data payload including a payload data length portion and a payload portion, and
- wherein the serial bit stream of the contents of the data payload is delayed such that timing between a last chip of the SFD and a first bit of payload data length portion is aligned.

12. The method of claim 11, in which the step of generating a structure and contents of a wireless data packet to be transmitted includes generating one of a first pre-defined value for the SFD, the first pre-defined value corresponding to a value of the SFD defined by the IEEE 802.15.4 standard, and a second pre-defined value for the SFD, the second pre-defined value corresponding to a value not defined by the IEEE 802.15.4 standard.

13. The method of claim 11, in which the step of determining includes determining whether the data payload of the wireless data packet is to be transmitted as a spread spectrum signal.

14. The method of claim 13, in which the step of determining includes determining whether the data payload of the wireless data packet is to be transmitted as a spread spectrum signal based upon the value of the SFD.

15. The method of claim 14, in which the data payload of the wireless data packet is modulated in a phase coherent, offset quadrature phase shift keying technique defined for spreading chips pursuant to the IEEE 802.15.4 standard.

16. The method of claim 11, in which the step of determining includes determining whether the data payload of the wireless data packet is to be transmitted as a non-spread spectrum signal.

17. The method of claim 16, in which the step of determining includes determining whether the data payload of the wireless data packet is to be transmitted as a non-spread spectrum signal based upon the value of the SFD.

18. The method of claim 17, in which the data payload of the wireless data packet is modulated in a phase coherent, offset quadrature phase shift keying technique defined for spreading chips pursuant to the IEEE 802.15.4 standard.

19. The method of claim 10, in which the serial bit stream of the contents of the data payload is delayed by an amount equal to the first interval of time used by the step of performing symbol PN code mapping plus the second interval of time used by the step of performing O-QPSK to MSK encoding.

20. A transmitter for transmitting data packets modulated in a phase coherent, offset quadrature phase shift keying technique defined for spreading chips pursuant to the IEEE 802.15.4 standard, each data packet including a preamble, a start of frame delimiter, a payload data length portion and a payload portion, the transmitter comprising:

a media access controller for generating a structure of a data packet, for generating a serial data stream of bits representing contents of the data packet, and for generating a frame length start signal that indicates length of a frame of the data packet;

a pseudorandom (PN) code generator, coupled to the media access controller, for spreading symbols of the contents of the data packet into PN chips, wherein the PN code accomplishes spreading symbols of the contents of the data packet into PN chips over a first interval of time;

an encoding circuit, coupled to the PN code generator, wherein the encoding circuit accomplishes O-QPSK to MSK encoding over a second interval of time;

a first tapped delay line, coupled to the media access controller, for delaying the contents of the data packet by an amount of time equal to the first interval of time plus the second interval of time;

a second tapped delay line, coupled to the media access controller, for delaying the frame length start signal by an amount of time equal to the first interval of time plus the second interval of time; and a multiplexer, having inputs coupled to the encoding circuit and to the first tapped delay line, for receiving, at one input, spread spectrum chips from the encoding circuit that represent the contents of the preamble and start of frame delimiter, and for receiving, at another input, bits from the first tapped delay line that represent the contents of the payload data length portion and the payload portion, the output from the multiplexer being selected by a delayed frame length start signal, the frame length start signal momentarily changing its value with occurrence, at an input of the multiplexer, of a beginning edge of a first bit of the payload data length portion.

* * * * *

UNITED STATES PATENT AND TRADEMARK OFFICE
CERTIFICATE OF CORRECTION

| | | |
|---|---|---|
| PATENT NO. | : 7,869,409 B2 | Page 1 of 1 |
| APPLICATION NO. | : 11/691349 | |
| DATED | : January 11, 2011 | |
| INVENTOR(S) | : Jorge Ivonnet et al. | |

It is certified that error appears in the above-identified patent and that said Letters Patent is hereby corrected as shown below:

Col. 9, in claim 19, line 34, after "symbol", insert --to--.

Col. 10, in claim 20, line 11, after "code", insert --generator--.

Signed and Sealed this
Eighth Day of March, 2011

David J. Kappos
*Director of the United States Patent and Trademark Office*